United States Patent
Liao et al.

(10) Patent No.: US 6,589,706 B1
(45) Date of Patent: Jul. 8, 2003

(54) PREPARATION OF CYANINE DYE FOR HIGH DENSITY OPTICAL RECORDING DISK

(75) Inventors: Wen-Yih Liao, Taichung (TW); Andrew Teh Hu, Hsinchu (TW); Chien-Liang Huang, Taoyuan (TW); Huei-Wen Yang, Taoyuan Hsien (TW); Der-Ray Huang, Kuang-Ming Hsin Tsun (TW); Ding-Yih Hu, Taipei (TW); Ming-Chia Lee, Taichung Hsien (TW); Hong-Ji Lee, Taoyuan Hsien (TW)

(73) Assignees: Industrial Technology Research Institute, Hsinchu (TW); National Tsing-Hua University, Hsinchu (TW)

( * ) Notice: Subject to any disclaimer, the term of this patent is extended or adjusted under 35 U.S.C. 154(b) by 0 days.

(21) Appl. No.: 09/721,270

(22) Filed: Nov. 22, 2000

(30) Foreign Application Priority Data

Jan. 28, 2000 (TW) ........................... 89101459 A

(51) Int. Cl.⁷ ................................. G11B 7/24
(52) U.S. Cl. ............................... 430/270.1; 430/270.1; 430/270.17; 430/270.18; 430/270.21; 548/455; 8/644; 8/638; 8/527
(58) Field of Search .................. 8/609, 611, 614, 8/644, 638, 527; 548/455; 430/270.21, 270.1, 270.17, 270.18

(56) References Cited

U.S. PATENT DOCUMENTS

| | | | |
|---|---|---|---|
| 4,944,980 A | * 7/1990 | Akutsu et al. | 428/64 |
| 5,019,476 A | 5/1991 | Kanno et al. | 430/20 |
| 5,219,707 A | * 6/1993 | Namba | 430/270 |
| 5,292,615 A | 3/1994 | Yamada et al. | 435/270 |
| 5,328,802 A | 7/1994 | Yanagisawa et al. | 430/273 |
| 5,332,608 A | 7/1994 | Tsuji et al. | 428/64 |
| 5,391,462 A | * 2/1995 | Arioka et al. | 430/271 |
| 5,424,171 A | 6/1995 | Yanagisawa et al. | 430/271 |
| 5,455,094 A | 10/1995 | Miyadera et al. | 428/64.9 |
| 5,512,416 A | * 4/1996 | Namba et al. | 430/270.21 |
| 5,900,348 A | 5/1999 | Hu et al. | 430/270.21 |
| 5,958,087 A | 9/1999 | Liao et al. | 8/644 |
| 6,291,045 B1 | * 9/2001 | Tajima et al. | 428/64.1 |

* cited by examiner

*Primary Examiner*—Mark Kopec
*Assistant Examiner*—Eisa Elhilo
(74) *Attorney, Agent, or Firm*—J.C. Patents

(57) ABSTRACT

A cyanine dye (I) for using in high density optical disc recording medium, having the following structure:

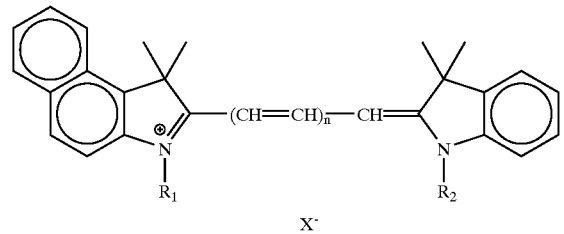

in which $R_1$ represents

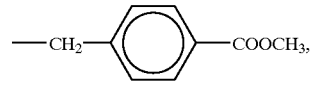

$R_2$ represents and alkyl with $C_1$–$C_{18}$ or

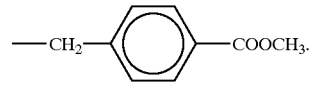

$X^-$ represents an acid anion. This cyanine dye is suitable for use as a $\lambda$=500 nm–650 nm visible light-absorbing organic dye useful as a high density optical disc recording medium.

17 Claims, 4 Drawing Sheets

PREPARATION OF CYANINE DYE FOR HIGH DENSITY OPTICAL RECORDING DISK

CROSS-REFERENCE TO RELATED APPLICATION

This application claims the priority benefit of Taiwan application serial no. 89101459, filed Jan. 28, 2000.

BACKGROUND OF THE INVENTION

1. Field of the Invention

The invention relates to preparation of cyanine dye. More particularly, the present invention relates to preparation of cyanine dye for a high density optical recording disk.

2. Description of the Related Art

There is at present an extreme need for a storage medium with higher storage density, smaller size and lower cost. As magnetic storage medium is not able to meet these requirements, organic media are highly sought after as an alternative. Organic dye which combines the advantages and characters of both the photosensitizer and photorecording medium, has been highly developed and adopted by the optoelectronic industry. The applications of organic dye include the fields of, for example, nonlinear optical devices, recording and displaying of optical disc data, photoresists, sensors and indicators for heat, light, and electrons during the transfer and storage of energy, medicine and biology, etc.

An organic dye, cyanine blue, was first synthesized by Greville Williams in 1856 (K. Venkataraman (ed.), The Chemistry of Synthetic Dyes, Vol. II, p.1143–1186, Academic Press, New York, 1952.). In 1875, Vogel discovered that Cyanine Blue has special photosensitive properties. Therefore, cyanine blue, which was originally used as a colorant, became a photosensitizer with a greater value. Different structures of cyanine dye have different $\lambda_{max}$ which varies from UV to IR. Therefore, cyanine blue can also serve as photosensitizer for photoresists or optical storage media in the electronic industry as well as being a colorant.

Cyanine dye, 3,3'-diethyl-12-acetyl-thiatetracyanine perchlorate, was first proposed for use in optical disc fabrication by Law et al. (K. Y. Law, P. S. Vincett, and G. E. Johnson, Appl. Phys. Lett., 39, 718(1981)). The cyanine dye and PVAc (poly(vinyl acetate)) were first mixed and then spin-coated to form an optical recording medium. After this successful use, several kinds of cyanine were developed for optical disc applications, such as those disclosed in U.S. Pat. Nos. 5,019,476, 5,292,615, 5,328,802, 5,332,608, 5,424,171, 5,455,094, 5,900,348, 5,958,087 etc. As to the method of fabrication, it was found that spin coating of the dye on the substrate could shorten the process and reduce costs when compared with the chemical vapor deposition (CVD) process; therefore spin coating has been accepted as the standard procedure and the stability of the organic dye and its solubility in organic solvent are critical factors for successful results.

SUMMARY OF THE INVENTION

It is therefore an object of the invention to provide cyanine dye (I) with $\lambda_{max}$ in the visible light range (500 nm–650 nm) for use as a high density optical disc recording medium. This cyanine dye is thermally stable for laser writing and has a good solubility in organic solvent. The cyanine dye of this invention has a high recording sensitivity and signal-to-noise ratio (S/N) value.

This invention uses indolenine having a side chain

with a pull electrons effect on nitrogen such that the cyanine dye is thermally stable and has a good solubility in organic solvent.

The formula for cyanine in this invention is shown as structure formula (I):

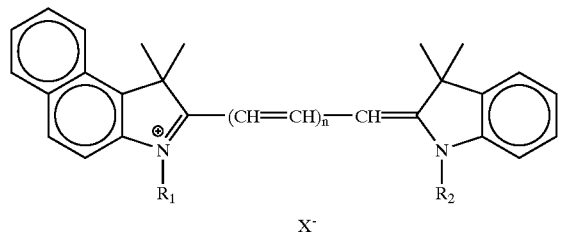

wherein $R_1$ represents

$R_2$ represents alkyl with $C_{1-C18}$ or

and n is 1. For cyanine dye (II) and (III), $X^-$ is halogen anion (such as $Cl^-$, $Br^-$, $I^-$ etc.), alkylsulfate anion (such as $CH_3SO_4^-$, $C_2H_5SO_4^-$ etc.), arylsulfonate anion

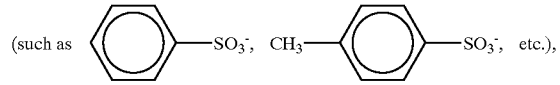

perchlorate anion (such as $ClO_4^-$ etc.), $TCNQ^-$, $PF_6^-$ or $BF_4^-$.

The structural formula (II) of cyanine dye, 2-[3-(1,3dihydro-1,1-dimethyl-3(4'-methoxycarbonyl)benzyl)-2H-benze[e]indol-2-ylidene]-1-propenyl]1,1-dimethyl-3butyl-1H-indolium perchlorate(E03-SL1), in one embodiment of this invention and is shown as follows:

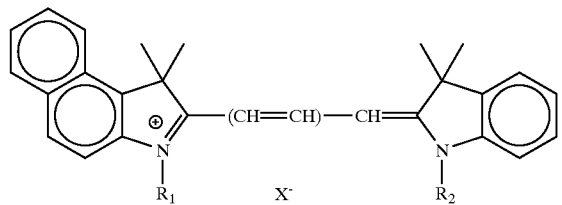

-continued

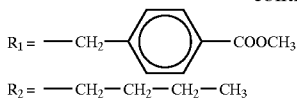

Preparation of dye (II) is described as follows. A mixed solution 4-chloromethylbenzoyl chloride (1.5–2.5 g, preferably 1.89 g) and methanol (0.3–0.4 g, preferably 0.32 g) is first dissolved in benzene (20–30 ml, preferably 25 ml). Pyridine (0.7–0.85 g, preferably 0.791 g) is then added to this mixture and heated to 40–50° C. (preferably 45° C.) for several hours to obtain methyl(4-iodomethyl)benzoate (MIB). MIB (2.5–3 g, preferable 2.76 g) and 2,3,3-trimethyl-4,5-benzo-3H-indole (1.5–2 g, preferably 1.75 g) are dissolved in benzene and heated for several hours such that 1-(4'-methoxycarbonyl)benzyl-2,3,3-trimethyl-4,5-benzo-3H-indolium iodide(MBTI) is obtained. 1-Iodobutane (2.5–3 g, preferably 2.76 g) and 2,3,3-trimethyl indolenine (2–2.5 g, preferably 2.38 g) are dissolved in benzene and heated for several hours (preferably 4 hours) to obtain 1-butyl-2,3,3-trimethyl indolenine(BII). MBTI (2.5–3 g, preferably 2.77 g) and N,N'-diphenylformamidine (1–1.5 g, preferably 1.12 g) are dissolved in acetic anhydride (15–25 ml, preferably 20 ml) and heated for several hours to obtain BFEI. BII (3–4 g, preferably 3.2 g), BFEI (6–7 g, preferably 6.5 g) and sodium acetate (0.5–1 g, preferably 0.82 g) are heated to 95–105° C. (preferably 100° C.) in acetate anhydride (preferably 50 ml) for several hours. Then, iodine is replaced by sodium perchlorate to abtain E03-SL1.

The structural formula (III) of cyanine dye, 2-[3-(1,3dihydro-1,1-dimethyl-3(4'-methoxycarbonyl)benzyl-2H-benze[e]indol-2-ylidene]-1-propenyl]1,1-dimethyl-3(4'-methoxycarbonyl)benzyl-1H-indolium perchlorate(E03-SL2), in another embodiment of this invention is shown as follows:

(III)

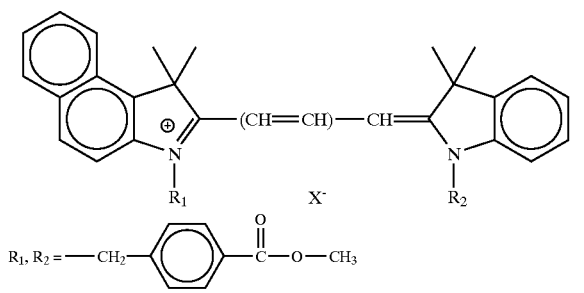

Preparation of dye (III) is described as follows. A mixed solution of 4-chloromethylbenzoyl chloride (1.5–2.5 g, preferably 1.89 g) and methanol (0.3–0.4 g, preferably 0.32 g) is first dissolved in benzene (20–30 ml, preferably 25 ml). Pyridine (0.7–0.85 g, preferably 0.791 g) is then added to this mixture and heated to 40–50° C. (preferably 45° C.) for several hours to obtain methyl(4-iodomethyl)benzoate (MIB). MIB (2.5–3 g, preferable 2.76 g) and 2,3,3-trimethyl-4,5-benzo-3H-indole (1.5–2 g, preferably 1.75 g) are dissolved in benzene to heat for several hours such that 1-(4'-methoxycarbonyl)benzyl-2,3,3-trimethyl-4,5-benzo-3H-indolium iodide (MBTI) is obtained. MIB (2.5–3 g, preferably 2.76 g) and 2,3,3-trimethyl indolenine (1.3–2 g, preferably 1.59 g) are dissolved in benzene and heated for several hours to obtain 1-(4'-methoxycarbonyl)benzyl-2,3,3-trimethyl indoleninium (MBII). MBTI (2.5–3 g, preferably 2.77 g) and N,N'-diphenylformamidine (1–1.5 g, preferably 1.12 g) are dissolved in acetic anhydride (15–25 ml, preferably 20 ml) and heated for several hours to obtain BFEI. MBII (4–4.5, preferably 4.15 g), BFEI (6–7 g, preferably 6.5 g) and sodium acetate (0.5–1 g, preferably 0.82 g) are heated to 95–105° C. (preferably 100° C.) in acetate anhydride (preferably 50 ml) for several hours. Then, iodine is replaced by sodium perchlorate to obtain E03-SL2.

The cyanine dye of the invention is applicable for recording discs and can further include cyanine dye such as 1-(4"-methoxycarbonyl) benzyl-3,3-dimethyl-1'-(4"-methoxycarbonyl)benzyl-3',3'-dimethyllindo-2:2'-pentamethine perchlorate(E05)(IV) for use as a photosensitizing dye, thereby raising reflectivity of recording disc.

When the mixture of dye (I) and dye (IV) is used, the weight percentage of dye (I) to the total make-up solution can be 1%–10% and the weight percentage of dye (IV) to dye (I) is preferably 3.5%–5%.

The dyes in this invention can be dissolved in an alcohol (such as methanol, ethanol, isopropanol, etc.), a ketone (such as acetone, methyl-ethyl ketone (MEK), etc.), an ether (such as ethyl ether, tetrahydrofuran, etc.), chloroform or dichloromethane. Thereafter, the dyes can be coated onto a blanket polycarbonate (PC) substrate by a spin coater through spray, roll-coating, immersion or spin-coating. In addition, cyanine dye not only serves as a photorecording medium but also as a photosensitizer for photography, transcription or printing.

When the mixture including dye (I), dye (IV) and solvent is used, the weight percentage of dye (I) to the total make-up solution can be 0.5%–7% and preferably 1%–3%.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

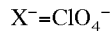

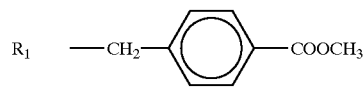

Figure 2:
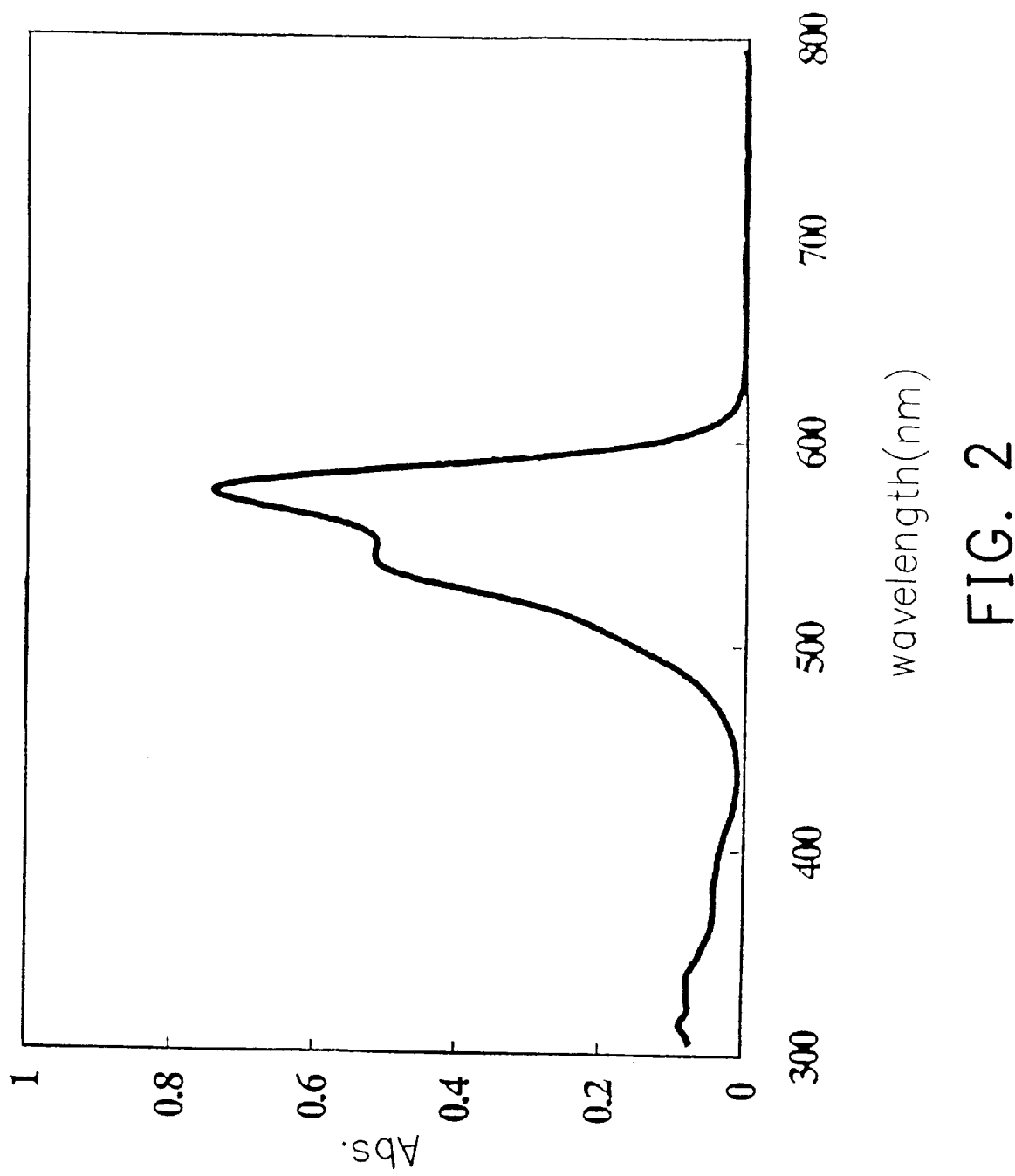

according to a preferred embodiment of this invention;

FIG. 2 shows an UV/Visible/IR absorption spectrum of the cyanine dye (III), where

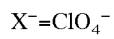

Figure 3:
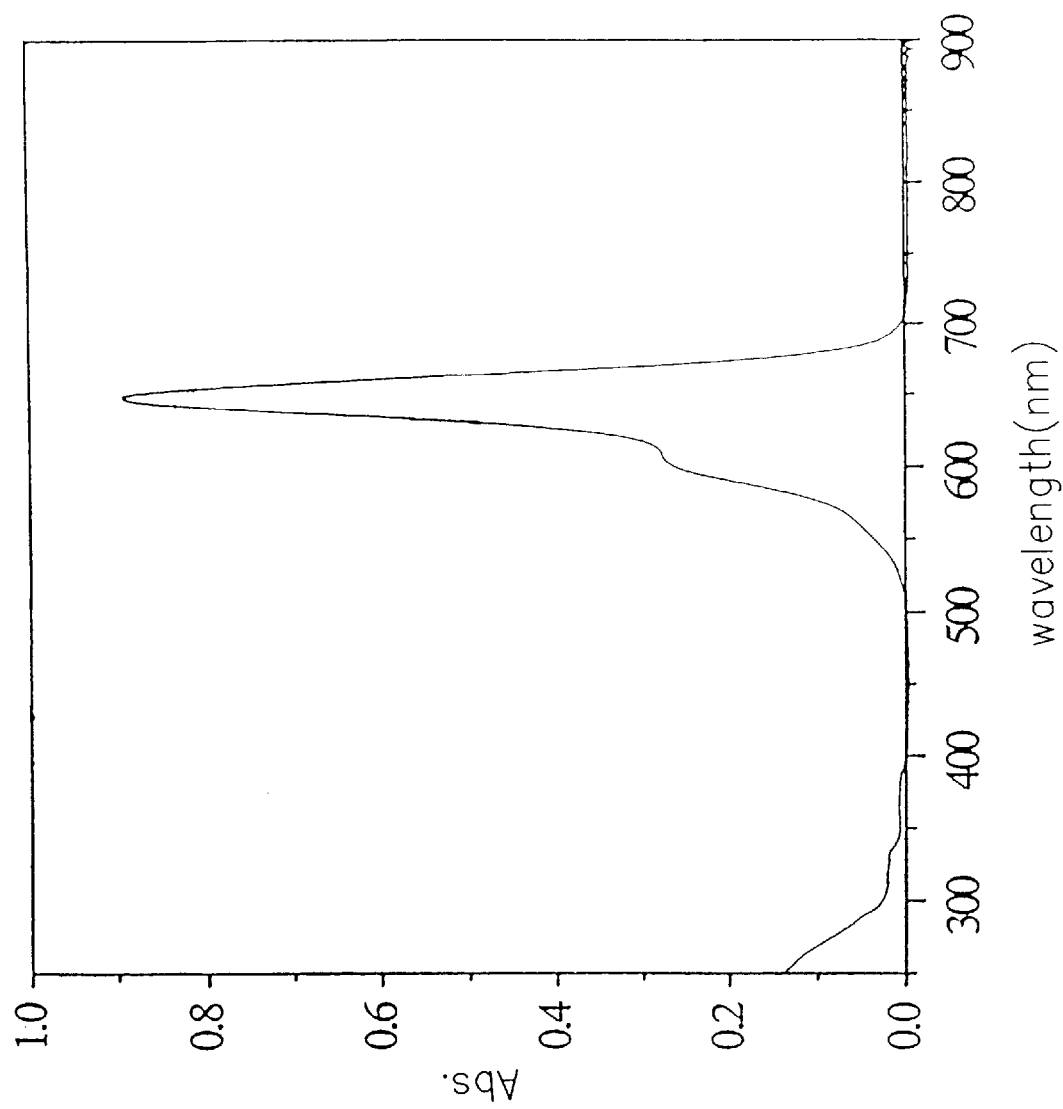

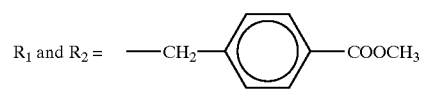

according to another embodiment of this invention;

FIG. 3 shows an UV/Visible/IR absorption spectrum of the cyanine dye (IV), where $X^- = ClO_4^-$

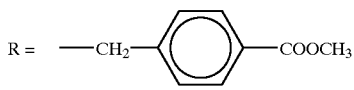

according to the other embodiment of this invention; and

Figure 4:
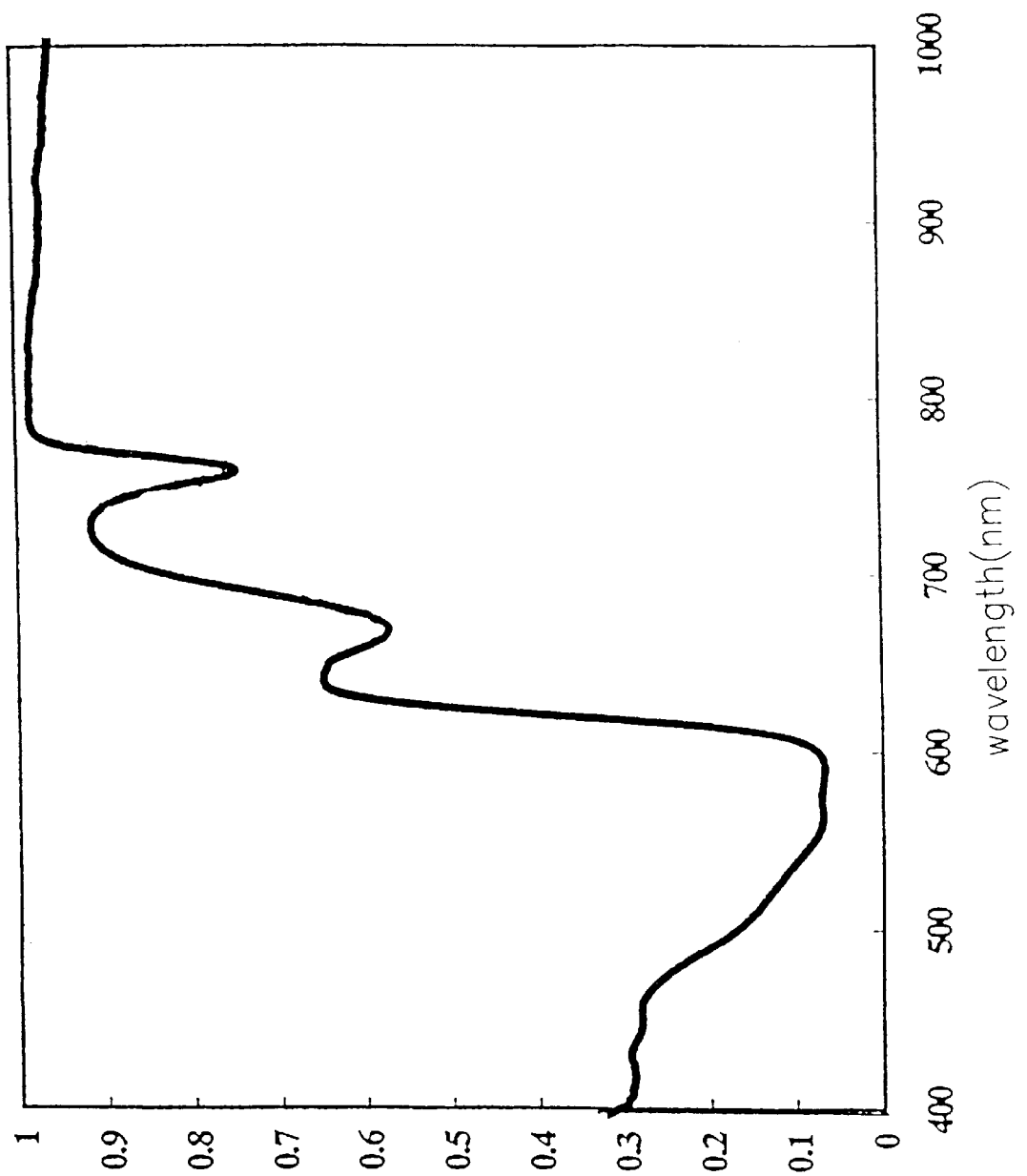

FIG. 4 shows a reflecting spectrum of the dyes mixture layer on optical recording disc with silver serving as a reflective layer.

DESCRIPTION OF THE PREFERRED EMBODIMENTS

FIRST EMBODIMENT

The structural formula of cyanine dye, 2-[3-(1,3dihydro-1,1-dimethyl-3(4'-methoxycarbonyl)benzyl)-2H-benze[e]indol-2-ylidene]-1-propenyl]1,1-dimethyl-3-butyl-1H-indolium perchlorate (E03-SL1), according to this invention is shown as follows:

(II)

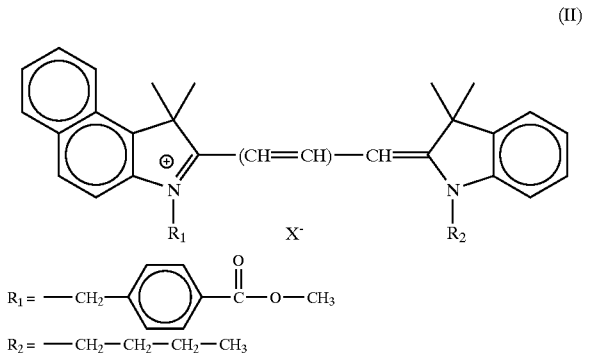

Preparation of dye (II) is described as follows. A mixed solution of methanol (0.32 g), 4-chloromethylbenzoyl chloride (1.89 g)(TCI chemical) and pyridine (0.791 g) is heated to 45° C. in benzene (25 ml) for 1–3 hours to obtain a whitematerial. The white material is stirred with sodium iodide (1.5 g) in acetone at 40° C. for 3–5 hours to produce a crude material, and then the mixture is isolated by filtration. The filtrate is evaporated and recrystallized from a mixture of dichloromethane and water to give light yellow crystals, methyl(4-iodomethyl)benzoate (MIB). The yield is 90%, mp 67° C.

Then, a mixed solution of MIB(2.76 g) and 2,3,3-trimethyl-4,5-benzo-3H-indole (TCI chemical) are heated in benzene at 80–90° C. for 4–8 hours. The solution is evaporated and recrystallized by methanol to give light gray crystals MBTI. The yield is 75%, mp 198° C.

Then, a mixed solution of 1-Iodobutane (2.76 g)(TCI chemical) and 2,3,3-trimethyl indolenine (TCI chemical) are heated in benzene at 80–85° C. for 4 hours. The solution is evaporated and recrystallized by ethyl acetate to give light gray crystals BII. The yield is 85%, mp 137° C.

A mixed solution of MBTI(2.77 g) and N,N'-diphenylformamidine (1.12 g)(TCI chemical) are heated in acetic anhydride (20 ml) at 100–120° C. for 2–3 hours. After cooling, the reaction mixture is poured into an aqueous solution of sodium perchlorate containing 0.72 g sodium perchlorate. The mixture is dissolved in dichloromethane solution, washed with water several times and then evaporated. The residue is recrystallized from alcohol to give BFEI. The productivity is 72%, mp 190° C.

Figure 1:
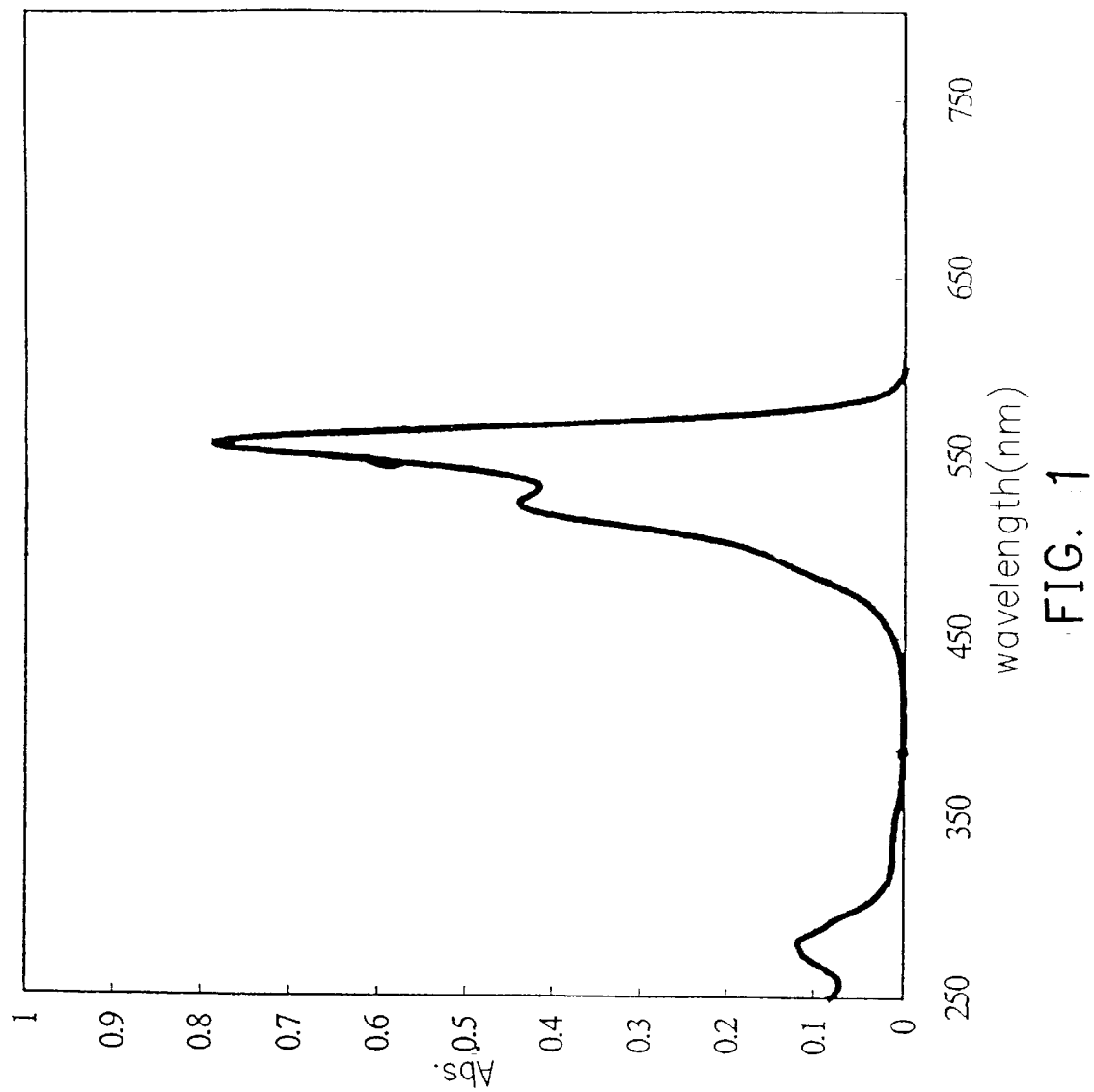
FIG. 1 shows an UV/Visible/IR absorption spectrum of the cyanine dye (II), where

A solution of BII(3.2 g), BFEI(6.5 g) and sodium acetate (0.82 g) are heated in 50 ml acetic anhydride at 100° C. for 1–3 hours. After cooling, the reaction mixture is poured into an aqueous solution of sodium perchlorate containing 1.17 g sodium perchlorate. The mixture is dissolved in dichloromethane solution, washed with water several times and then evaporated. The residue is recrystallized from alcohol to give cinnamon crystals of E03-SL1. The productivity is 76%, mp 237° C. FIG. 1 shows that $\lambda_{max}$(EtOH) is 571 nm.

SECOND EMBODIMENT

The structural formula of cyanine dye, 2-[3-(1,3dihydro-1,1-dimethyl-3(4'-methoxycarbonyl)benzyl-2H-benze[e]indol-2-ylidene]-1-propenyl]1,1-dimethyl-3(4'-methoxycarbonyl)benzyl-1H-indolium perchlorate(E03-SL2), of this invention is shown as follows:

(III)

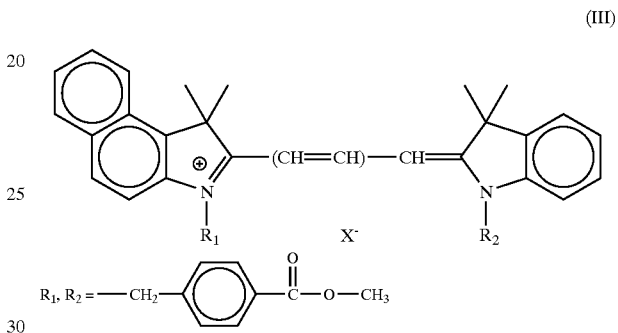

Preparation of dye (III) is described as follows. A mixed solution of methanol (0.32 g), 4-chloromethylbenzoyl chloride (1.89 g)(TCI chemical) and pyridine (0.791 g) is heated to 45° C. in benzene (25 ml) for 1–3 hours to obtain a whitematerial. The white material is stirred with sodium iodide (1.5 g) in acetone at 40° C. for 3–5 hours to give a crude material, and then the mixture is isolated by filtration. The filtrate is evaporated and recrystallized from a mixture of dichloromethane and water to give light yellow crystals, methyl(4-iodomethyl)benzoate (MIB). The yield is 90%, mp 67° C.

Then, a mixed solution of MIB(2.76 g) and 2,3,3-trimethyl-4,5-benzo-3H-indole (TCI chemical) are heated in benzene at 80–90° C. for 4–8 hours. The solution is evaporated and recrystallized by methanol to give light gray crystals MBTI. The yield is 75%, mp 197° C.

Then, a mixed solution of MIB (2.76 g) and 2,3,3-trimethyl indolenine (1.59 g)(TCI chemical) are heated in benzene at 80–85° C. for 3–6 hours. The solution is evaporated and recrystallized by ethyl acetate to give light gray crystals MBII. The yield is 81%, mp 140° C.

A mixed solution of MBTI(2.77 g) and N,N'-diphenylfornamidine (1.12 g)(TCI chemical) are heated in acetic anhydride (20 ml) at 100–120° C. for 2–3 hours. After cooling, the reaction mixture is poured into an aqueous solution of sodium perchlorate containing 0.72 g sodium perchlorate. The mixture is dissolved in dichloromethane solution, washed with water several times and then evaporated. The residue recrystallized from alcohol to give BFEI. The productivity is 72%, mp 190° C.

A solution of BII(4.15 g), BFEI(6.5 g) and sodium acetate (0.82 g) are heated in 50 ml acetic anhydride at 100° C. for 1–3 hours. After cooling, the reaction mixture is poured into an aqueous solution of sodium perchlorate containing 1.17 g sodium perchlorate. The mixture is dissolved in dichloromethane solution, washed with water several times and then evaporated. The residue recrystallized from alcohol to give cinnamon crystals of E03-SL2. The productivity is 74%, mp 240° C. FIG. 2 shows that $\lambda_{max}$(EtOH) is 574 nm.

The dye in this invention applicable for recording disc further includes cyanine dye such as 1-(4"-methoxycarbonyl)benzyl-3,3-dimethyl-1'-(4"-methoxycarbonyl)benzyl-3',3'-dimethyllindo-2:2'-pentamethine perchlorate (E05) (IV) for photosensitizing dye, such that reflectivity of the recording disc is increased. The structural formula of cyanine dye (IV) is shown as follows, in which $X^-$ represents $ClO_4^-$.

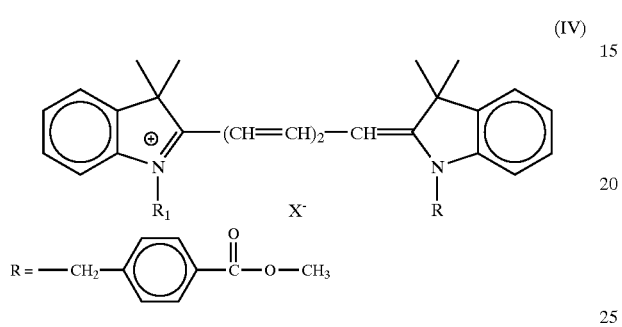

(IV)

Preparation of dye (IV) is described as follows. A mixed solution of methanol (0.32 g), 4-chloromethylbenzoyl chloride (1.89 g)(TCI chemical) and pyridine (0.791 g) is heated to 40° C. for three hours in benzene (25 ml) to give methyl(4-iodomethyl)benzoate. The latter is stirred with sodium iodide (1.5 g) in dried acetone at 40° C. for 3–5 hours to give a crude material, and then the mixture is isolated by filtration. The filtrate is evaporated and recrystallized from a mixture of dichloromethane and water to give light yellow crystals, methyl(4-iodomethyl)benzoate(MIB). The yield is 90%, mp 67° C.

A mixed solution of MIB (0.276 g) and 2,3,3-trimethylindolenine(TCI chemical) (1.752 g) are heated in benzene at 80–85° C. for 3–6 hours. The solution is evaporated and recrystallized by ethyl acetate to give light yellow crystals, MBII. The yield is 81%, mp 140° C.

A solution of MBII(6.16 g), 3-anilinoacrylaldehyde anil (2.85 g) and sodium acetate (1.64 g) in 20 ml of acetic anhydride are heated at 100° C. for 1–3 hours. After cooling, the reaction mixture is poured into an aqueous solution of sodium perchlorate containing 1.41 g sodium perchlorate. The mixture is dissolved in dichloromethane solution, washed with water several times and then evaporated. The residue is recrystallized from alcohol to give blue crystals. The productivity is 74%, mp 201° C. FIG. 3 shows that $\lambda_{max}$(EtOH) is 648 nm.

APPLICATION OF EMBODIMENT

Dye(II) and dye(IV) are used as optical recording media. Dye(II)(2.5 g) and dye(IV)(0.152 g) are dissolved in 2,2,3,3-tetrafluoropropanol to make up a solution of 100 g. The dyes are coated onto a blanket polycarbonate (PC) substrate by a spin coater, through a dipping process at 30–500 rpm for 1–10 sec, a spinning out process at 1000–3000 rpm for 5–30 sec and a baking process at 2000–5000 rpm for 5–30 sec. A reflection layer made of aluminum, copper, chromium or alloy, having a thickness of about 500–2000 Å, is sputtered on top of the dye recording layer. Finally, a blanket polycarbonate is lacquered on the forgoing polycarbonate.

FIG. 4 shows a reflecting spectrum of dyes mixture on an optical recording disc. At 630–660 nm, the reflection rate reaches 60%. The above characters of the compact made with the cyanine dye mixture of this invention indicate that the aforementioned cyanine dye mixture can successfully serve as high density optical disc recording media.

Other embodiments of the invention will appear to those skilled in the art from consideration of the specification and practice of the invention disclosed herein. It is intended that the specification and examples be considered as exemplary only, with a true scope and spirit of the invention being indicated by the following claims.

What is claimed is:

1. A cyanine dye (I) for manufacturing an optical recording disc, having a general structural formula:

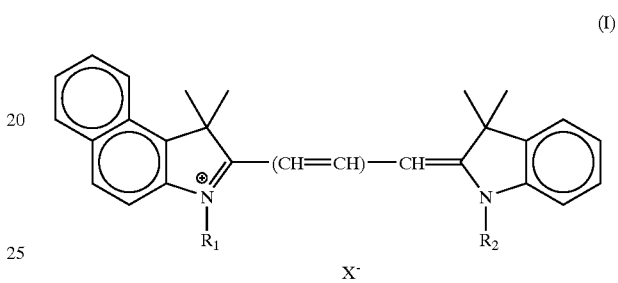

(I)

wherein

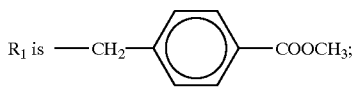

$R_1$ is —$CH_2$—⟨benzene⟩—$COOCH_3$;

$R_2$ is selected from a group consisting of —$CH_2$-benzene—$COOCH_3$ and an alkyl group with $C_1$–$C_{18}$; and $X^-$ is an acid anion.

2. The cyanine dye according to claim 1, wherein $X^-$ is selected from a group consisting of halogen, alkylsulfate, arylsulfonate, perchlorate, $TCNQ^-$, $PF_6^-$ and $BF_4^-$.

3. The cyanine dye according to claim 1, wherein

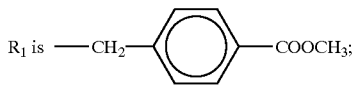

$R_1$ is —$CH_2$—⟨benzene⟩—$COOCH_3$;

$R_2$ is —$C_4H_9$;
$X^-$ is $ClO_4^-$; and
the cyanine dye is shown as structural formula (II)

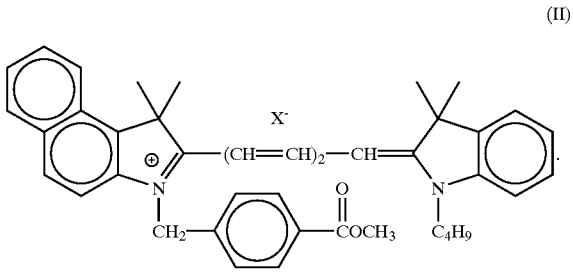

(II)

4. The cyanine dye according to claim 1, wherein

R₂ is 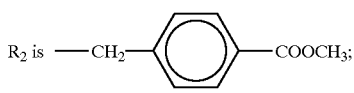

X⁻ is ClO₄⁻; and
the cyanine dye is shown as structural formula (III)

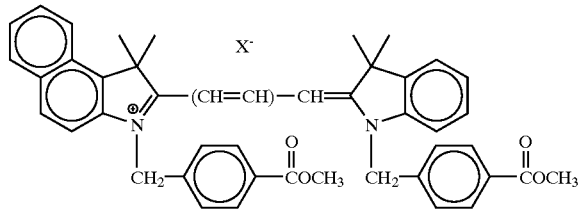
(III)

5. The cyanine dye according to claim 1, wherein a reflective layer for the optical disc in accordance with the cyanine dyes is selected from a group consisting of gold, silver, aluminum, copper, chromium and alloy.

6. The cyanine dye according to claim 1, wherein the cyanine dye is solubilized in 2,2,3,3-tetrafluoropropanol.

7. The cyanine dye according to claim 1, wherein the cyanine dye is solubilized in diacetonalcohol.

8. The cyanine dye according to claim 1, wherein the cyanine dye is solubilized in ketone.

9. The cyanine dye according to claim 1, wherein the cyanine dye is solubilized in alcohol.

10. The cyanine dye according to claim 1, wherein the cyanine dye is solubilized in ether.

11. The cyanine dye according to claim 1, wherein the cyanine dye is solubilized in chloroform.

12. The cyanine dye according to claim 1, wherein the cyanine dye is solubilized in dichloromethane.

13. The cyanine dye according to claim 1, wherein the cyanine dye solubilized in dimethylformamide.

14. A cyanine dye solution for manufacturing an optical recording disc comprising the cyanine dye (I) according to claim 1 wherein a weight percentage of the cyanine dye (I) to the total weight is 1%–10%.

15. The cyanine dye solution according to claim 4, wherein the weight percentage of the cyanine dye (I) is 3%–20%.

16. A cyanine dye solution for manufacturing an optical recording disc comprising the cyanine dye (I) according to claim 1 wherein a weight percentage of the cyanine dye (I) to the total weight is 0.5%–7%.

17. The cyanine dye solution according to claim 16, wherein the weight percentage of the cyanine dye (I) to the total weight is 1%–3%.

* * * * *